(12) United States Patent
Garland

(10) Patent No.: US 6,252,596 B1
(45) Date of Patent: Jun. 26, 2001

(54) COMMAND ENTRY HIGHLIGHT EDITING FOR A MENU SELECTION SYSTEM AND METHOD

(75) Inventor: Harry B. Garland, Mountain View, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/053,142

(22) Filed: Mar. 31, 1998

(51) Int. Cl.$^7$ ...................................................... G06F 3/00
(52) U.S. Cl. ........................ 345/352; 345/146; 345/333; 345/349
(58) Field of Search .................................... 345/333, 352, 345/949, 955, 114, 349, 334, 116, 977, 146, 353

(56) References Cited

U.S. PATENT DOCUMENTS

| | | | |
|---|---|---|---|
| 5,119,079 | * | 6/1992 | Hube et al. ............................ 345/146 |
| 5,565,888 | * | 10/1996 | Selker ..................................... 345/146 |
| 5,956,035 | * | 9/1999 | Sciammarella et al. .............. 345/353 |

* cited by examiner

Primary Examiner—John Cabeca
Assistant Examiner—Sy D. Luu

(74) Attorney, Agent, or Firm—Paul Hentzel

(57) ABSTRACT

System 10 (shown in FIG. 1A) provides highlighting for a command entry within a menu of command entries displayed on monitor 10M. In menu 12 of entry options 12A–E (shown in FIG. 1B), entry 12C is highlight enlarged. Structure library 10S contains a collection of visible display structures available in memory for forming the displayed command entries. Each visible display structure is defined by a cluster of attributes available in the memory of structure library 10S. Attribute morphing functions in association with at least some of the attributes are available for morphing the attributes from a pre-morphic visible state to a different post-morphic visible state inorder to highlight one of the command entries. The attribute morphing functions may be stored in structure library 10S together with the associated attributes (as shown in the Figure table), or stored separately in memory in morphing function library 10F. Libraries 10S and 10F may contain the actual morphing function in the form of a mathematical formula expressing the frame-to-frame change of the morphed attribute as a function of time. Command entry editor 10E is responsive to the operator through operator input 10K for editing the visible display structures, attributes, and morphing functions. Selector 14 is activated by the operator through SELECT command from operator input 10K for selecting the highlighted command entry in the displayed menu. Selector 14 then provides SELECTION signal to application program 10P (shown in dash) for directing the application program.

24 Claims, 6 Drawing Sheets

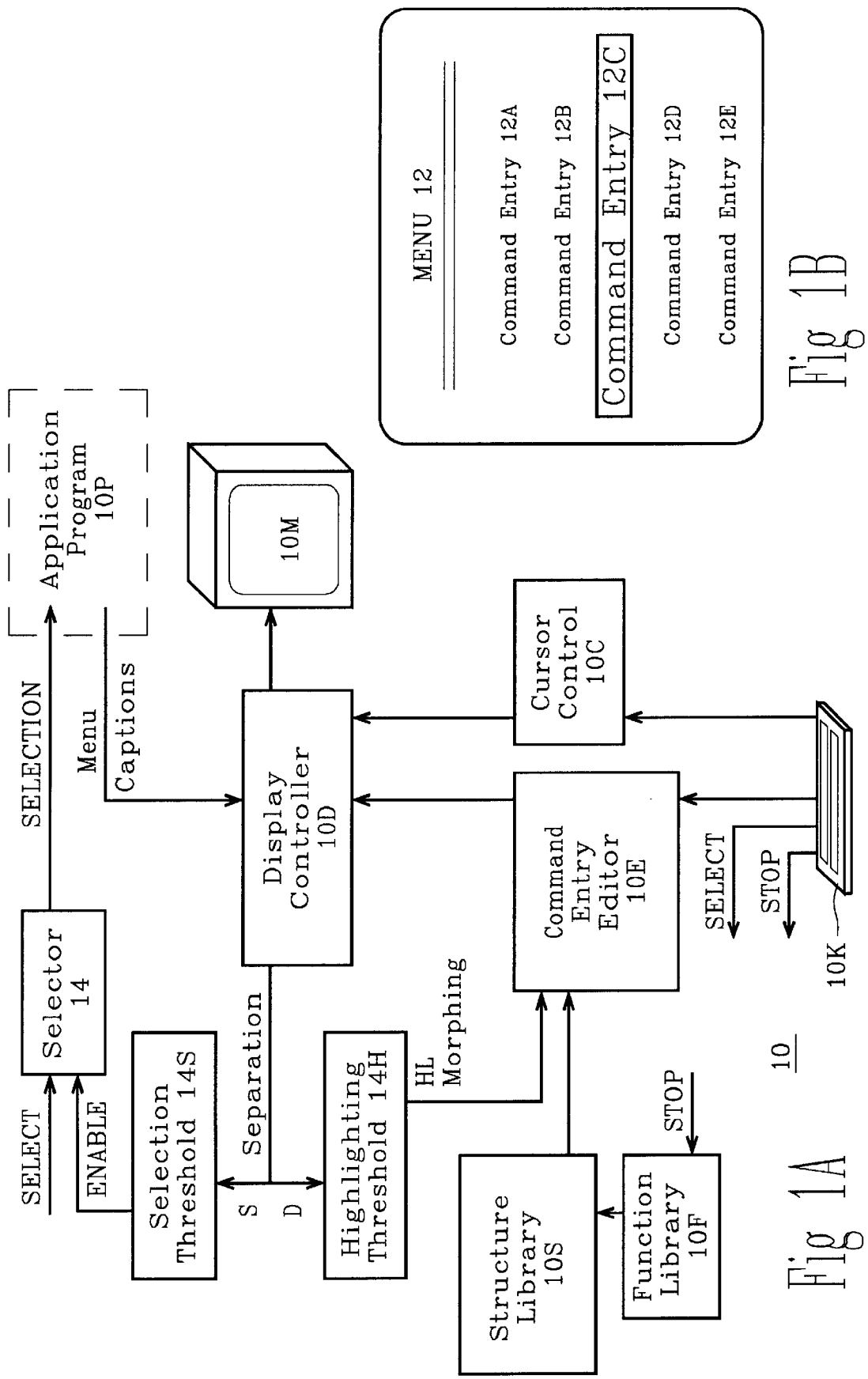

COMMAND ENTRY VISIBLE DISPLAY STRUCTURES

| Visible Display Structure | Morphable Attribute | Pre Morphic State | Post Morphic State | Morphing Function |
|---|---|---|---|---|
| BORDER | Height<br>Length<br>Thickness<br>Color<br>  Red<br>  Green<br>  Blue | 2 Pixels<br>6 Pixels<br>1 Pixel<br><br>15<br>0<br>0 | 4 Pixels<br>12 Pixels<br>2 Pixels<br><br>0<br>0<br>15 | Deceleration<br>Deceleration<br>Linear<br><br>Linear<br>Linear<br>Linear |
| NON-HL CAPTION | Font<br>Size<br>Color<br>  Red<br>  Green<br>  Blue | Aerial<br>3 Pixels<br><br>10<br>10<br>10 | Aerial<br>3 Pixels<br><br>10<br>10<br>10 | |
| HIGHLIGHT CAPTION | Font<br>Size<br>Color<br>  Red<br>  Green<br>  Blue | Roman<br>3 Pixels<br><br>0<br>10<br>0 | Roman<br>6 Pixels<br><br>0<br>10<br>0 | Deceleration |

Fig 2

US Patent Directory

22

5,046,116
Melen 5,257,323
Melen/Garland 5,544,045
Garland/Melen 5,487,118
Melen 5,296,693
Hartogs 5,325,167
Melen 5,719,960
R Krtolica 5,479,418
Hartogs 5,379,349
Avi-Itzhak 5,416,311

32H 5,248,139
GARLAND/MAY/MELEN 5,475,768
Diep/Avi-Itzhak/Garland 5,600,835
Garland/Hunter/Roberts 5,495,485
Hartogs 5,539,840
R Krtolica/Malitsky 5,652,782
Hartogs 5,559,898
Avi-Itzhak 5,619,594
Melen 5,519,787
Melen 5,606,690
Hunter/Roberts/Garland 5,657,381
Hartogs 5,625,707
Diep/Avi-Itzhak/Garland 5,719,960
Melen

Fig 3

Displaying Command Menu
having a Plurality
of Command Entries
on a Display Monitor Providing Cursor
within the Displayed Menu Positioning Cursor
for Highlighting Determining
Visible Display Structures
and Attributes Providing Range
of Incrementing Rates Editing Range of Rates Morphing
Determined Attributes
from a Pre-Morphic State
to a Post-Morphic State Selecting Highlighted
Command Entry

Fig 5

COMMAND ENTRY HIGHLIGHT EDITING FOR A MENU SELECTION SYSTEM AND METHOD

TECHNICAL FIELD

This invention relates to highlighting for command entries, and more particularly to such highlighting which assists the operator during selection of a command entry from a menu.

BACKGROUND

Heretofore the background of the caption text in directory menus has been highlight colored to assist the operator in selecting a command entry. This background color change was typically instantaneous, a two frame transition done between frames. That is, the background changed from a non-highlight color in one frame to the highlight color in the next frame as the cursor touched the command entry. To the operator, this change to highlight color appeared instantaneous. Such abrupt changes are rare in the real world outside of the electronic world of PC display monitors. Most real world changes are smooth transitions occurring over a perceptible time period. Oncoming traffic approaches us smoothly over a ten second time frame or longer. Elevator doors open and shut in several seconds. Coffee may spill over a time period of ½ second. Hardly any real world events are step changes occurring faster than the reaction time of the human retina—about 1/20 of a second. However, abrupt changes are commonplace in the electronic world. A person interfacing with at a PC may be exposed to hundreds of instantaneous changes in only a few minutes. Over time these repeated visual impacts can cause operator tension, headaches and other deleterious effects. The operator distress caused by visual impacts may be viewed as carpal tunnel syndrome of the optic nervous system, and is an affront to the new workplace science of ergonomics.

SUMMARY

It is therefore an object of this invention to provide a system and method for morphing the highlight attributes of command entries within a menu.

It is another object of this invention to provide such a system and method for editing the morphing of highlighted command entries to customize the display presentation and enhance the profile of the highlighting.

It is a further object of this invention to provide such a system and method in which the morphing is smooth and optically ergonomic.

It is a further object of this invention to provide such a system and method in which attributes are highlighted by enlargement morphing.

It is a further object of this invention to provide such a system and method which employs a constricted small non-highlight font for presenting more information to the operator on the display monitor.

It is a further object of this invention to provide such a system and method in which the rate of morphing is controlled to provide linear and non-linear rates of change.

It is a further object of this invention to provide such a system and method in which the morphing direction may be reversed from forward morph to reverse morph.

Briefly, these and other objects of the present invention are accomplished by providing a system for highlighting a command entry within a menu of command entries displayed on a monitor to assist an operator with selection of a command entry. A library of visible display structures form the displayed command entries. A cluster of attributes within the structure library define each visible display structure. A cursor control is responsive to the operator for positioning a cursor within the displayed menu. Attribute morphing functions associated with at least some of the attributes, morph the attributes from a pre-morphic state to a post-morphic state inorder to highlight a command entry. A command entry editor is responsive to the operator for editing the visible display structures forming the command entries, and editing the attributes defining the visible display structures, and editing the attribute morphing functions highlighting the command entries. A display controller is responsive to the cursor control and to the editor for presenting the cursor and the edited command entries to the monitor. A selector selects the command entry within a highlighted command button from the displayed menu when activated by the operator.

BRIEF DESCRIPTION OF THE DRAWING

Further objects and advantages of the present highlight system and method and the operation of the highlighting editor will become apparent from the following detailed description and drawing in which:

FIG. 1A is a functional block diagram of highlighting system 10 showing command entry editor 10E and display controller 10D for presenting a display on monitor 10M;

FIG. 1B shows a simple display menu 12 with command entry 12C highlighted by enlargement;

FIG. 2 is a table showing command entry visible display structures and associated attributes stored in of structure library 10S;

FIG. 3 shows a complex menu with three columns of non-highlighted entries, and a single highlighted entry within a command button in the center column;

FIG. 5 is a flow chart showing the steps of the general method of highlighting command entries.

Figure 4A:
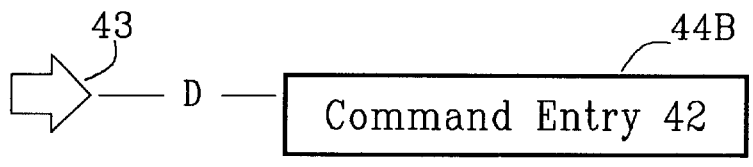
FIG. 4A shows command entry 42 within command button 44B separated from cursor 43 by distance D.

The first digit of each reference numeral in the above figures indicates the figure in which that element is most prominently shown. The second digit indicates related structural elements, and a final letter (when used) indicates a sub-portion of an element.

REFERENCE NUMERALS IN DRAWING

The table below lists all of the reference numerals employed in the figures, and identifies the element designated to by each numeral.

10 highlighting system 10
       10C cursor control 10C
       10D display controller 10D
       10E command entry editor 10E
       10F function library 10F 10K operator input 10K
10M display monitor 10M
10P application program 10P
10S structure library 10S
12 simple display menu 12
   12C command entry 12C
   12A–E entry options 12A–E
14 selector 14
   14H highlight threshold device 14H
   14S selection threshold device 14S
32 menu 32
   32H highlighted patent entry 32H
42 command entry 42
43 cursor 43
   44B command button 44B
   44H highlight perimeter 44H
   44S selection perimeter 44S Glossary of Terms The following terms are used in the claims to specify this invention. Each term is defined briefly below in the order of appearance in the claims.

Highlighting—any suitable distinction in any attribute of a command entry which may be visibly presented on a display in order to enhance the visual profile of a highlighted command entry over the non-highlighted command entries.

Library—a data storage device or memory such as structure library 10S or function library 10F for storing a collection of visible display structures or morphing functions, which are accessible to the operator during editing of the command entries.

Visible Display Structure—an image feature capable of being displayed on a monitor to form all or part of a command entry. Each visible display structure is defined by a cluster of attributes.

Attribute—an independent property of a visible display structure which can be added, deleted or morphed independently of the other attributes of that visible display structure.

Morph—a term of art based on a corruption of the word "metamorphose". In this disclosure, morph means to smoothly change the visual display of an attribute defining a visible display structure.

Morphing—a corruption of the verb "metamorphosing"

Morphic—a corruption of the adjective "metamorphic".

Morphing Function—a mathematical formula or relationship associated with an attribute expressing the morphing parameters of that attribute.

Caption Text—human readable symbols such as text or icons in a command entry containing instructional information for the operator about that entry.

Command Button—a border or other visible display structure encompassing a command entry for highlighting that command entry to the operator.

Numerical Field—a data field within a structure library for storing numerical data which may be incremented or decremented by an integer counter within a display controller for advancing each morphed attribute from a pre-morphic state, through the intermediate morphic states, to a post-morphic state.

General Embodiment—FIGS. 1A–B

System 10 (shown in FIG. 1A) provides highlighting for a command entry within a menu of command entries displayed on monitor 10M. Highlighting effects such as enlargement assist the operator with entry selection from among the non-highlighted command entry options in the menu. In menu 12 of entry options 12A–E (shown in FIG. 1B), command entry 12C (and the surrounding command button) is highlight enlarged. The enlarged command entry may be more easily read by the operator when selecting an entry. In addition, the enlargement is visual feedback to the operator indicating which command entry is about to be selected. The command entry may be highlighted in ways besides enlargement for enhancing the highlight profile, such as the presence of a border surrounding highlighted command entry 12C.

Structure library 10S contains a collection of visible display structures available in memory for forming the displayed command entries. A visible display structure may be any suitable feature capable of being displayed on a monitor. Such features include a caption of informational text, a border around the caption text (as shown in FIG. 1B), the background area behind the caption text, and underlining beneath the caption text. Each visible display structure is defined by a cluster of attributes available in the memory of structure library 10S. The attributes may be any suitable property which is can be included in a visible display structure, such as height, length, line thickness, color, intensity, etc. An example of several visible display structures each with a cluster of attributes stored in structure library 10S is shown in the table of FIG. 2. The structure library may contain the actual structure or attribute data which is then processed by display controller 10D. Alternatively, the library may merely contain a code identifying the structure or attribute to display controller 10D.

Cursor control 10C is responsive to the operator through operator input 10K for positioning a cursor within the displayed menu next to a command entry being considered for selection. Operator input 10K may be any suitable operator input device such as a keyboard or a mouse.

Attribute morphing functions in association with at least some of the attributes are available for morphing the attributes from a pre-morphic visible state to a different post-morphic visible state inorder to highlight one of the command entries. The attribute morphing functions may be stored in structure library 10S together with the associated attributes (as shown in the Figure table), or stored separately in memory in morphing function library 10F. Library 10F provides the morphing functions to command entry editor 10E, permitting the operator to modify the morphing functions and to establish the association between the morphing functions and the attributes for editing the highlighting of the command entries. Libraries 10S and 10F may contain the actual morphing function in the form of a mathematical formula expressing the frame-to-frame change of the morphed attribute as a function of time. That is, the morphing functions may be in the standard mathematical format $y=f(x)$ where:

$y$ is the morphed parameter such as size or color and $x$ is display time, clock cycles, a percentage of a morph time window, or other parameter having some relationship with the passage of display frames.

The morphing function formula is then processed through display controller 10D to provide the required display changes in the morphed attribute. Alternatively, the morphing functions may be in the form of morph codes identifying the morphing function formula to display controller 10D.

Command entry editor 10E is responsive to the operator through operator input 10K for editing the visible display structures forming the command entries, and editing the attributes defining the visible display structures, and editing the attribute morphing functions highlighting the command entries. Editing by the operator may customize the presentation of the command entries, and enhance the highlighting profile. Any attribute may be morphed to provide a visibly distinct highlight.

Selector 14 is activated by the operator through SELECT command from operator input 10K for selecting the highlighted command entry in the displayed menu. In the perimeter embodiment of FIG. 4, a command entry must be highlighted by a command button from the editor, and the selector must be ENABLED by selection threshold device 14S before the command entry of that command button may be selected. The command button is a highlighted area of the monitor display encompassing the command entry, and is typically designated by a border. The command button may be responsive to the cursor position for causing the selection of the highlighted command entry. Selector 14 then provides SELECTION signal to application program lop (shown in dash) for directing the application program. Application program lop is the source of the menu of command entries, and provides menu captions in ASCII to display controller 10D for display on monitor 10M.

Display controller 10D is also responsive to cursor control 10C and to editor 10E for presenting the cursor movement and the edited command entries to the monitor. The display controller includes a frame generator which generates the raster scans of pixels required to present the menu image on monitor 10M. The display controller may include a math unit and an integer counter for converting each morphing function formula into interframe increment changes in the attribute morphed by that morphing function.

Structure Library (FIG. 2 Table)

An example of attribute clusters defining a border visible display structure, a non-highlight caption font, and a highlight caption font is shown in the table of FIG. 2. These attributes clusters are stored an attribute column in structure library 10S, and are available to display controller 10D to present a border and fonts for the caption text to the monitor. Structure library 10S may store other visible display structures and attribute clusters, but only the border attributes and caption attributes are shown in the FIG. 2 table.

Border

The attributes (visible properties) of a rectangular border or command button around the highlighted command entry may include:

height (number of scan lines along the vertical axis of the display monitor), length (number of pixels along the horizontal axis of the display monitor), thickness (number of pixels in the thickness of the line forming the border), and color rendered by red and green and blue components on a 0–15 color intensity scale.

Each of the above border attributes are morphable and may be smoothly morphed from a pre-morphic state (listed in the pre-morphic column of structure library 10S) to a different post-morphic state (listed in the post-morphic column of structure library 10S). In the FIG. 2 example, both the height and the length are morph enlarged to twice the pre-morphic size as indicated by the pixel entries in the morphic state columns. The line thickness is morphed to three times the pre-morphic thickness. For convenience of illustration, size and thickness are given in FIG. 2 as pixels. These pixel quantities are converted directly into display image dimensions by display controller 10D. Size and thickness in the table could be given directly as dimensions such as millimeters or inches (or in time), for conversion into display dimensions. The TWIP unit (1,440 of an inch) is easily converted to many systems and monitors employing various resolutions, and may be preferred. Alternatively, a unitless scaler may be employed representing a percentage of the display dimension unity.

The red component of the border color has been morph decreased from a red intensity of 15 to a red intensity of 0. The blue component has been morph increased from a blue intensity of 0 to a blue intensity of 15. The green component has not been morphed and remains at 0. The color intensity number between 0 and 15 is unitless representing an intensity level within a color intensity scale having 16 levels. Other embodiments may employ expanded color scales having more color intensity levels such as 256. As the morphing proceeds, the rectangle enlarges in both dimensions, the line becomes thicker, and the color of the line changes from red to blue. Many different colors may be created (including white, black, and greyscale) by changing the relative intensity stored in the red, green and blue numerical fields. The apparent fading of a pre-morph color into a post-morph color may be effected by a simultaneous double morph. The pre-morp color is decrease morphed at the same time that the post-morph color is increased morphed.

Non-Highlight Caption

The caption attributes (visible properties) of a simple non-highlight caption may include:

font (style of the characters forming the caption), size (height, length and stroke width of the characters), and color rendered by red and green and blue components on the 0–15 color intensity scale.

In the FIG. 2 example, the non-highlight font is aerial narrow (see FIG. 3) and the color is white (all intensities at 10). The non-highlight font is not morphed. The each pre-morphic state is identical to the adjacent post-morphic states.

Highlight Caption

The highlight caption may have the same caption attributes as the non-highlight caption with different values in the numerical fields. In the FIG. 2 example, the highlight font is expanding Times Roman (see FIG. 3) and the color is green.

Menu of Command Entries—FIG. 3

Each command entry may have a caption containing informational text for instructing the operator about that entry. Menu 32 in the embodiment of FIG. 3 is a three column directory of issued US patents. The caption text with each entry is the issue number and inventor(s) of a US patent. Selecting the highlighted (enlarged) patent entry 32H retrieves the text and drawing of that patent for presentation on monitor 10M. One of the visible display structures in structure library 10S of the FIG. 2 table is a non-highlight caption with a font attribute code identifying the size and style of the non-highlight font forming the caption text of the non-highlighted command entries. The non-highlight font is preferable small in size and constricted in style (shown in FIG. 3) such as aerial narrow for maximum display of caption text within the limited space on the monitor. The small non-highlight font permits more columns of command entries to be crowded into the display presentation, with more patent entry rows in each column. The operator can see more command entry options in a single screen of display monitor 10M.

Another one of the visible display structures in structure library 10S of the FIG. 2 table is a highlight caption with a font attribute code identifying the size and style of the highlight font forming the caption text of the command entry within the highlighted command button. The highlight font is preferable large in size and expansive in style (shown in FIG. 3) such as Times Roman for providing optimal readability by the operator. The enlarged highlight font clearly indicates to the operator which command entry is being considered for selection, and permits the operator to easily read the highlight font at a glance without having to lean forward toward the monitor to scrutinize the text. The highlight font may be may have special characteristics such italics or bold or all caps (as shown in FIG. 3), for enhancing the highlight profile against the initial caps only of the non-highlight patent entries. The highlight font may be presented in pseudo three dimensions by adding line of perspective and shading the face created by the lines. The shape of border around the highlighted entry may be edited to further enhance the highlighting. The rectangular border of FIG. 1B minimal software burden and is therefore easy to generate and move. However, other shapes with more highlight potential may be employed to catch the operators eye. The border employed for highlighted entry 32H in FIG. 3 is an elongated octagon, a rectangle with beveled corners. The enlarged highlighted captions may partially occult the surrounding non-highlighted captions (as shown in FIG. 3), which further reduces selection confusion.

Figure 4B:
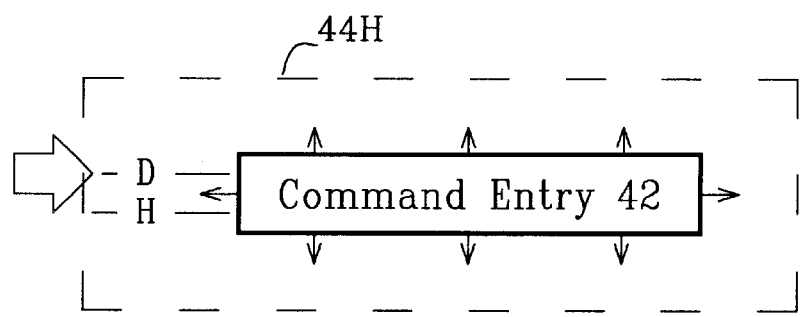
FIG. 4B shows the cursor and command entry of FIG. 4A separated by a smaller distance which, is less than threshold distance H which initiates highlight morphing by enlargement.

Highlight Perimeter—FIGS. 4A and 4B

Figure 4C:
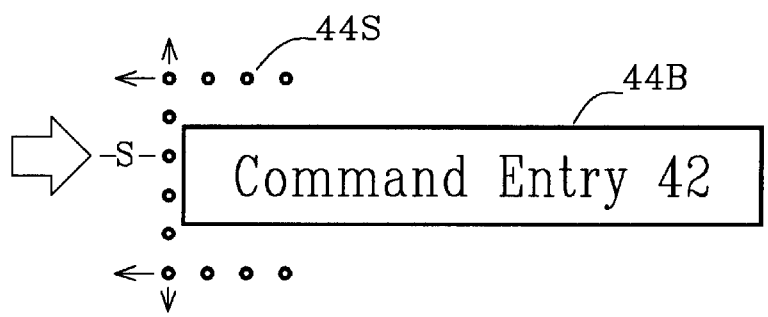
FIG. 4C shows cursor 43 and selection perimeter 44S separated by distance S.
Figure 4D:
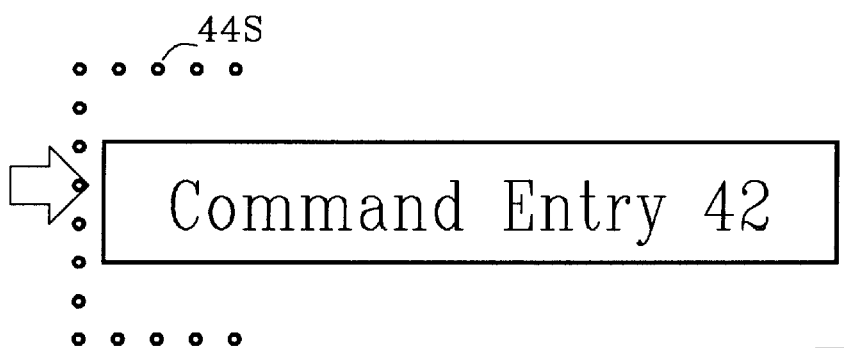
FIG. 4D shows cursor 43 penetrating into selection perimeter 44S enabling selector 14.

The decreasing distance separating the cursor and the command entries in the display presentation from display controller 10D, may be employed to initiate the highlight morphing. In FIG. 4A, position separation distance D between cursor 43 and command button 44B encompassing command entry 42 is great (D>H). Command entry 42 is non-highlighted (pre-morphic state), and selector 14 (see FIG. 1A) is not enabled. Highlight threshold device 14H is responsive to separation distance D out of display controller 10D, for initiating the morphing of the attributes which highlight command button 44B. The highlighting is initiated when position separation D is less than a highlight threshold separation H defined by highlight threshold device 14H. Highlight threshold separation H defines highlight perimeter 44H (shown in dash in FIG. 4B) around command button 44B, which initiates the highlight morphing when penetrated by cursor 43. In FIG. 4B, cursor 43 is closer to command button 44B and command entry 42 than in FIG. 4A (D<H). The arrow point of the cursor protrudes slightly passed highlight perimeter 44H into the region within the perimeter. Small expansion arrows shown in FIG. 4B indicate the resulting vertical and horizontal enlargement highlight morphing of command button 44B (both text and border). FIG. 4C shows continued enlargement morphing of command button 44B, and FIG. 4D shows the command button fully morphed (post-morphic state). The dashed highlight perimeter may be a construction by the display controller for internal use only, and is not necessarily part of the visible display presentation from display controller 10D. In the highlight perimeter embodiment of FIG. 4, the cursor does not have to actually touch any of the command entries inorder to initiate the highlighting. The cursor only has to get close enough to touch the highlight perimeter of one of the command entries.

Reverse Morphing

As the cursor approaches a command entry and passes into the highlight perimeter, the command entry becomes highlighted. The morph attributes of the highlighted, command button may forward morph the command entry therein from the pre-morphic state to the post-morphic state. After this forward morphing (but before selection), the cursor may be repositioned to a new position proximate a new command entry away from the prior position and prior highlighted command entry. As the cursor moves away from the prior highlighted command entry and passes out of the highlight perimeter, the prior command entry loses highlight status. The new command entry may simultaneously gain highlight status. The morph attributes of the prior command entry may then reverse morph from the post-morphic state back to the pre-morphic state, indicating the loss of status.

In a different embodiment, the highlight threshold separation H may define a highlight perimeter around the cursor. In this curser perimeter embodiment, the highlight morphing is initiated when the cursor is moved close enough to a command entry to become penetrated by that command entry.

Selection Perimeter—FIGS. 4C and 4D

The decreasing distance separating the cursor and a selection perimeter in the display presentation from display controller 10D, may be employed to enable selector 14. In FIG. 4C, position separation distance S between cursor 43 and selection perimeter 44S (shown in dots) around highlighted command entry 42, is great. Selector 14 (see FIG. 1A) is not enabled. Selection threshold device 14S provides a threshold separation distance which defines selection perimeter 44S. Selection threshold device 14S is responsive to position separation distance S out of display controller 10D, for enabling selector 14 to be activated by the operator through the SELECT command for selection of the highlighted command entry. Selector 14 is enabled when distance S is zero. That is when cursor 43 touches or penetrates selection perimeter 44S as shown in FIG. 4D. A selection threshold morphing function associated with selection threshold device 14S, morph increases the penetrated selection perimeter 44S (or morph decreases S), after the highlight morphing has been initiated by highlight threshold device 14H. The increasing selection perimeter 44S around highlighted command entry 42, (or decreasing S) causes the perimeter to expand into the cursor. The expanding selection perimeter 44S (indicated by expansion arrows), enables selector 14 when penetrated by cursor 43 as shown in FIG. 4D. In a simpler embodiment, the expanding selection perimeter may coincide with expanding edge of the highlight border. Use of the expanding selection perimeter permits the operator to activate selector 14 without requiring the cursor to first touch the highlighted command entry. Command entries may be selected "on the fly".

The highlight perimeter and selection perimeter may be defined by pixel zones instead of separation distances D and S. In this zone embodiment, display controller 10D establishes a highlight zone of pixels around each command entry, and a separation zone of pixels around the command button for the highlighted command entry. When the cursor is moved to occupy a pixel of the highlight pixel zone of a command entry, that command entry becomes highlighted. When a pixel of the expanding selection zone is occupied by the cursor, selector 14 becomes enabled.

Method of Operation—FIG. 5

The primary steps of a general method of highlighting a command entry within a menu of command entries to assist an operator with entry selection is shown in the flow chart of FIG. 5. The steps of the method are described below with reference to highlighting system 10 of FIG. 1A.

Displaying a command menu having a plurality of command entries on a display monitor for operator selection. Each command entry is formed by visible display structures defined by attributes (see FIG. 2 table).

Providing a position cursor within the displayed menu.

Positioning the cursor within the displayed menu for highlighting a command entry.

Determining at least one visible display structure and at least one attribute thereof of that command entry which is to highlight the command entry based on the contents of structure library 10S. The determined visible display structure(s) and attribute(s) are retrieved from the library and processed for presentation on the display monitor.

Morphing the at least one determined attribute from a pre-morphic state to a post-morphic state in order to highlight the command entry. The morphing step may be a series of subliminal incremental changes which provide a smooth morph without instantaneous changes detectable by the operator. Smooth, continuous morphs, such as morphs based on mathematically continuous zoom functions, are generally more optically ergonomic than instantaneous step changes (two frame morphs). The morphing of each morphed attribute is established by incrementing or decrementing the numerical field for that attribute through a counter within display controller 10D.

Selecting the highlighted command entry with the morphed attribute. Application program 10P is responsive to the operator selection through SELECTION signal for implementing the requirements of the selected command entry. In the patent directory embodiment of FIG. 3, the application program responds to the highlighted command entry by retrieving the record of U.S. Pat. No. 5,248,139 from an application program data base.

The above general method may have the following additional steps:

Providing a range of incrementing and decrementing rates of the numerical field for controlling the morphing rate of the attributes.

Editing the range of rates for enhancing the highlighting profile of the command entry. In general, morphing rates may be controlled in two ways:

1) by small alterations in the step size of the individual increments, and
2) by changing the length of time between increments, the increment frequency.

Figure 6:
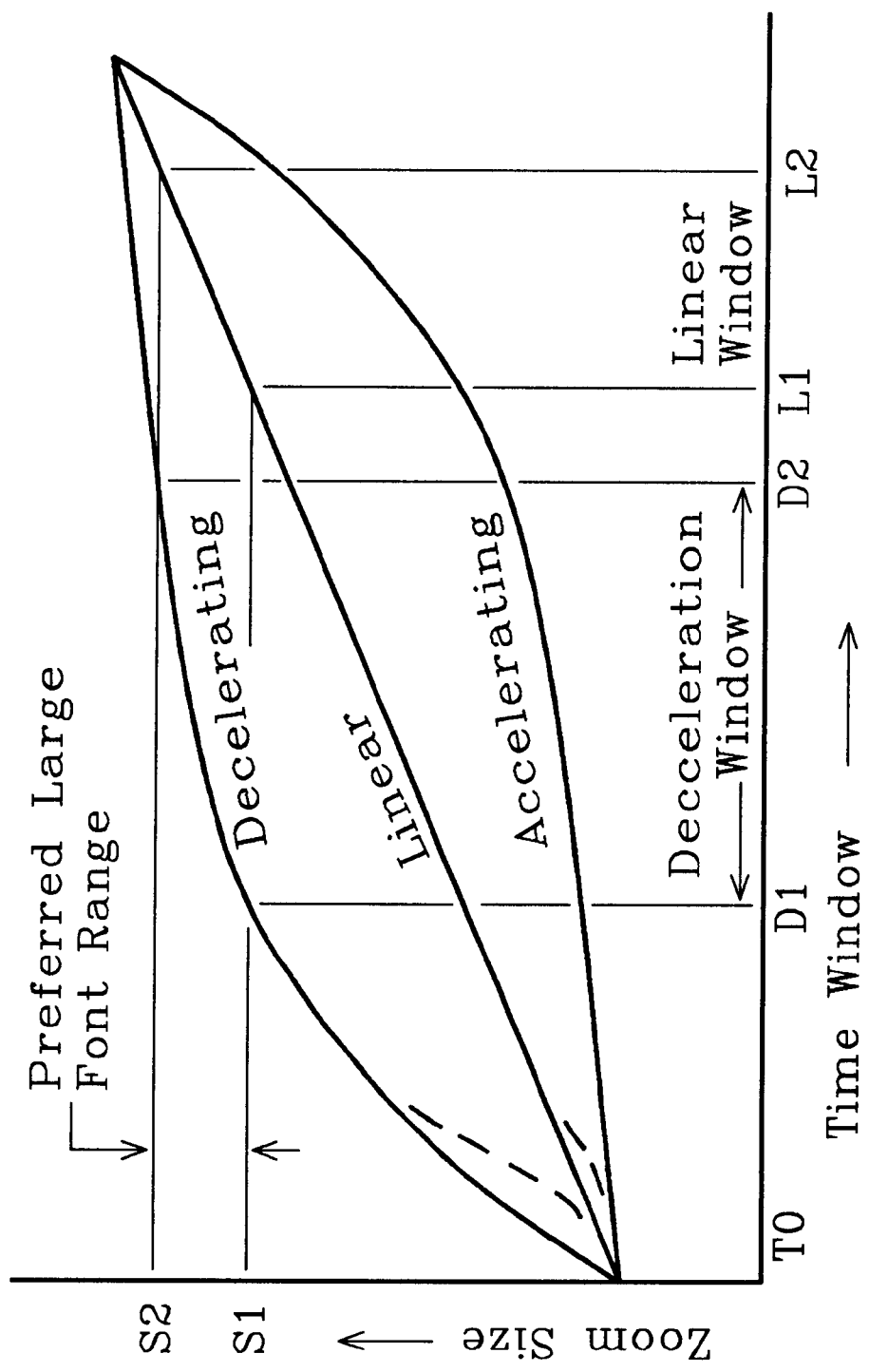
FIG. 6 is a plot of enlargement morphing against time illustrating several morphing rates.

Zooming Rates—FIG. 6

Various rates of enlargement or zoom speed for the font size attribute is shown by the plots in the graph of FIG. 6. The zoom time (horizontal axis) plotted against the resulting zoom size (vertical axis), reveals the rate of change of size over time (slope along each plot). In a linear embodiment, (illustrated by the "Linear" plot in FIG. 6), the numerical field is incremented or decremented at a constant rate to provide linear morphing of the size attribute. The caption text is morphed to a larger text size (zoomed up) by slowly incrementing the integer in the numerical field for the font size. The numerical field may be incremented or decremented at a non-linear rate such as deceleration (illustrated by the "Decelerating" plot), or acceleration (illustrated by the "Accelerating" plot), to provide decelerating or accelerating morphing of the size attributes. An enlargement morphing function associated with the caption attribute defines the rate of caption text enlargement.

The operator may issue a morph STOP command from keyboard 10K for stopping the enlargement morphing of the caption text when the enlargement is within a stopping time window defined by a range of larger sizes preferred by the operator. In the graph of FIG. 6, the operator preferred range of sizes is illustrated by size range S1–S2 (extending along the vertical axis). In the case of linear enlargement, the operator stops the zoom-up when the enlarging font size enters the preferred S1–S2 size range. The stop occurs within time window L1–L2 (extending along the horizontal time axis). This preferred size as defined by the stop time maybe retained in memory for future use by the operator.

In the case of decelerating enlargement, the stop time for the S1–S2 range is within time window D1–D2 which is longer than linear stop window L1–L2. The decelerating zoom-up has an initial fast rate of size increase for the small sizes, which slows as the size approaches the operator's preferred size range S1–S2. The decelerating zoom provides the longer D1–D2 time window in which the operator may to stop the zoom-up. The extended D1–D2 time is caused by the decelerating rate of enlargement morphing of the caption text as the enlargement approaches the operator preferred range S1–S2. In addition, the D1–D2 deceleration window opens sooner along the horizontal time axis. That is, the zoom time is shorter, and the operator may issue the STOP command sooner.

The initial or T0 (time zero) size of the caption text may be zero, and the highlighted caption text zooms-up from this invisible start font to the larger visible sizes. However, in the embodiment of FIG. 6, each of the plots has a finite initial T0 which is small but visible. The starting discontinuity at T0 of the linear zoom and decelerating zoom may be minimized by an initial zero (or near zero) slope period (shown in dash). The initial series of increments (or decrements) after T0 may be sufficiently small to effect a smooth change from the initial T0 size to the first few morph sizes. These initial small increments of the numerical field of the morphed attribute, subliminally advance that attribute from the pre-morphic state through the first incremental states following the pre-morphic state. Similarly, the final few increments (or decrements) of the morphed attribute, may smoothly and subliminally advance that attribute from the final incremental states before the post-morphic state to the post-morphic state.

Industrial Applicability

It will be apparent to those skilled in the art that the objects of this invention have been achieved as described hereinbefore by providing a system and method for morphing the highlight attributes of command entries within a menu. The morphing of highlighted command entries may be edited by a command entry editor to customize the display presentation and enhance the profile of the highlighting. The morphing may be smooth and optically ergonomic by employing small increments or low incrementing rates. A small constricted non-highlight font may be employed for presenting more information to the operator in the limited space of the display monitor.

Conclusion

Clearly various changes may be made in the structure and embodiments shown herein without departing from the concept of the invention. Further, features of the embodiments shown in the various figures may be employed with the embodiments of the other figures.

Therefore, the scope of the invention is to be determined by the terminology of the following claims and the legal equivalents thereof.

What is claimed is:

1. System for highlighting a command entry within a menu of command entries displayed on a monitor to assist an operator with selection of a command entry, comprising:
   a library of visible display structures available for forming the displayed command entries;
   a cluster of attributes within the structure library available for defining each visible display structure;
   cursor control responsive to the operator for positioning a cursor within the displayed menu;
   attribute morphing functions associated with at least some of the attributes, available for morphing these attributes from a pre-morphic state to a post-morphic state in order to highlight a command entry;
   a command entry editor responsive to the operator for editing the visible display structures forming the command entries based on the visible display structures in the library, and editing the attributes defining the visible display structures based on the attribute clusters in the library, and editing the attribute morphing functions highlighting the command entries;
   display controller responsive to the cursor control and to the editor for presenting the cursor and the edited command entries to the monitor; and
   selector for selecting the highlighted command entry from the displayed menu when the selector is activated by the operator.

2. The highlighting system of claim 1, further comprising:
   a highlight threshold means responsive to the display controller, which initiates the morphing of attributes defining visible display structures to highlight a particular command entry when the position separation between the cursor and that particular command entry is less than a highlight threshold separation defined by the highlight threshold means.

3. The highlighting system of claim 2, wherein the highlight threshold separation defines a highlight perimeter around the particular command entry which initiates the highlight morphing of attributes when the cursor penetrates the entry highlight perimeter.

4. The highlighting system of claim 2, wherein the highlight threshold separation defines a highlight perimeter around the cursor which initiates the highlight morphing of attributes when the particular command entry penetrates the cursor highlight perimeter.

5. The highlighting system of claim 2, further comprising:
   a selection threshold means responsive to the display controller, for defining an entry selection perimeter around the highlighted command entry, and for enabling the selector when the cursor penetrates the selection perimeter.

6. The highlighting system of claim 5, further comprising:
   a selection threshold morphing function associated with the selection threshold means, which morph increases the penetrated selection perimeter after the highlight morphing has been initiated by the highlight threshold means.

7. The highlighting system of claim 1, wherein the command entries have captions containing informational text.

8. The highlighting system of claim 7, wherein the library of visible display structures includes:
   a code identifying a highlight font forming the caption text of the highlighted command entry, which highlight font is an expansive font for providing optimal readability by the operator; and
   a code identifying a non-highlight font forming the caption text of the non-highlighted command entry, which non-highlight font is a constrictive font for maximum display of caption text on the monitor.

9. The highlighting system of claim 7, wherein the highlighted command entry has a command button displayed on the monitor encompassing the caption thereof, which command button is formed by visible display structures.

10. The highlighting system of claim 9, further comprising:
    a caption attribute within the structure library defining the size of the caption text;
    a command button attribute within the structure library defining the size of the command button; and
    an enlargement morphing function associated with the caption attribute and the command button attribute for highlighting the caption text and command button through enlargement.

11. The highlighting system of claim 10, further comprising:
    enlargement stopping means responsive to the operator for stopping the enlargement morphing of the caption text when the enlargement thereof is within an operator preferred range of sizes, which range of sizes defines a stopping time window.

12. The highlighting system of claim 11, wherein the rate of enlargement morphing of the caption text decelerates as the enlargement approaches the operator preferred range expanding the stopping time window.

13. The highlighting system of claim 1, wherein the attribute morphing functions are in the structure library with the associated attributes.

14. The highlighting system of claim 1, further comprising:
    a library of morphing functions for providing the attribute morphing functions to the editor permitting the operator to determine the association between the morphing functions and the attributes for editing the highlighting of the command entries.

15. A method of highlighting a command entry within a menu of command entries displayed on a monitor to assist an operator with selection of a command entry, comprising the steps of:
    displaying a command menu having a plurality of command entries for operator selection, each command entry formed by visible display structures, which visible display structures are defined by attributes;
    providing a cursor within the displayed menu;
    positioning the cursor within the displayed menu for highlighting a command entry;
    determining at least one visible display structure and at least one attribute thereof forming the command entry to be highlighted in response to the operator;
    morphing the at least one determined attributes from a pre-morphic state to a post-morphic state in order to highlight the command entry, through a series of subliminal incremental chances which provide a smooth morph from the pre-morphic state to the post-morphic state without instantaneous changes detectable by the operator, the morphing of each morphed attribute established by an numerical field which is incremented or decremented to morph the attribute;
    providing a range of incrementing and decrementing rates of the numerical field for morphine the attribute; and editing the range of rates for enhancing the highlighting of the command entry.

16. The highlighting method of claim 15, further comprising the additional step of:

selecting the highlighted command entry with the morphed attribute.

17. The highlighting method of claim 15, wherein the numerical field is incremented or decremented at a constant rate to provide linear morphing of the attribute.

18. The highlighting method of claim 15, wherein the numerical field is incremented or decremented at a decelerating rate to provide decelerating morphing of the attribute.

19. The highlighting method of claim 15, wherein the numerical field is incremented or decremented at an accelerating rate to provide accelerating morphing of the attribute.

20. The highlighting method of claim 15, wherein the initial increment or decrement of the numerical field of the morphed attribute, advances that attribute from the pre-morphic state to the first incremental state following the pre-morphic state, which advance is visually subliminal.

21. The highlighting method of claim 20, wherein the final increment or decrement of the numerical field of the morphed attribute, advances that attribute from the final incremental state before the post-morphic state to the post-morphic state, which advance is visually subliminal.

22. The highlighting method of claim 15, wherein during the morphing step the morph attribute of the highlighted command entry is forward morphed from the pre-morphic state to the post-morphic state.

23. The highlighting method of claim 22, wherein after the forward morphing step and before the selection step, the additional steps of:

repositioning the cursor to a new position proximate a new command entry away from the prior position and prior highlighted command entry with the forward morphed attribute;

forward morphing the morph attribute of the new command entry from the pre-morphic state to the post-morphic state; and reverse morphing the morph attribute of the prior command entry from the post-morphic state to the pre-morphic state.

24. A computer readable medium containing a computer program that highlights a command entry within a menu of command entries displayed on a monitor to assist an operator with selection of a command entry, by directing the computer to execute the steps of:

displaying a command menu having a plurality of command entries for operator selection, each command entry formed by visible display structures, which visible display structures are defined by attributes;

providing a cursor within the displayed menu;

positioning the cursor within the displayed menu for highlighting a command entry;

determining at least one visible display structure and at least one attribute thereof forming the command entry to be highlighted in response to the operator; and morphing the at least one determined attribute from a pre-morphic state to a post-morphic state in order to highlight the command entry, through a series of subliminal incremental changes which provide a smooth morph from the pre-morphic state to the post-morphic state without instantaneous changes detectable by the operator, the morphing of each morphed attribute established by an numerical field which is incremented or decremented to morph the attribute;

providing a range of incrementing and decrementing rates of the numerical field for morphine the attribute; and editing the range of rates for enhancing the highlighting of the command entry.

* * * * *